United States Patent [19]

Stevens et al.

[11] Patent Number: 5,531,167

[45] Date of Patent: Jul. 2, 1996

[54] LOCKING HANGER BRACKET FOR USE IN A QUICK-CHANGE MODULAR SHELVING SYSTEM AND SHELVING SYSTEM EMPLOYING SUCH HANGER BRACKET

[75] Inventors: Kenneth A. Stevens, Harleysville; Bradley J. Carlson, Wilkes-Barre, both of Pa.

[73] Assignee: Metro Industries, Inc., Reno, Nev.

[21] Appl. No.: 297,831

[22] Filed: Aug. 30, 1994

[51] Int. Cl.[6] .................................................. A47B 9/00
[52] U.S. Cl. ........................ 108/106; 108/144; 248/222.1
[58] Field of Search ................................ 108/106, 107, 108/144, 192, 193, 180, 153; 24/645, 647, 573.4; 211/181, 187, 186; 248/221.3, 222.1

[56] References Cited

U.S. PATENT DOCUMENTS

| | | | |
|---|---|---|---|
| 2,963,170 | 12/1960 | Lori | 108/106 X |
| 3,664,274 | 5/1972 | Bustos | 108/144 |
| 3,757,705 | 9/1973 | Maslow | 108/144 |
| 4,020,951 | 5/1977 | Wurthner | 248/222.1 X |
| 4,048,768 | 9/1977 | Good | 248/221.1 X |
| 5,048,429 | 9/1991 | Freiberg | 108/106 |
| 5,415,302 | 5/1995 | Carlson et al. | 108/144 X |

Primary Examiner—Jose V. Chen
Attorney, Agent, or Firm—Fitzpatrick, Cella, Harper & Scinto

[57] ABSTRACT

A shelving system includes a horizontal polygonal base shelf assembly and a substantially identical horizontal top shelf assembly, a plurality of vertical support posts, and one or more intermediate shelf assemblies positioned between the top shelf assembly and the bottom shelf assembly. Each intermediate shelf assembly is supported by hanger brackets which are removably secured to the support posts. Each hanger bracket is provided with a locking clip for securing the intermediate shelf and the hanger bracket to the support posts. In this manner, each intermediate shelf assembly can be quickly installed and removed without the necessity of disassembling the other components of the shelving system, and the installed intermediate shelf can be securely mounted in the shelving system.

21 Claims, 6 Drawing Sheets

LOCKING HANGER BRACKET FOR USE IN A QUICK-CHANGE MODULAR SHELVING SYSTEM AND SHELVING SYSTEM EMPLOYING SUCH HANGER BRACKET

BACKGROUND OF THE INVENTION

1. Field of the Invention

The present invention relates generally to "knockdown" modular shelving systems and, more particularly, to a shelving system with a hanger bracket that permits easy and secure installation and/or removal of one or more shelves without requiring the disassembly of the entire shelving system.

The shelving system of the present invention provides sturdy, durable, and versatile shelving, and will find use in commercial, industrial and residential applications and environments.

2. Description of the Prior Art

Modular shelving systems are well known. For example, U.S. Pat. Nos. 3,138,123 (Maslow) and 3,208,408 (Maslow) disclose knockdown shelving units sold by InterMetro Industries Corporation that have achieved substantial commercial success under the trademark ERECTA SHELF.

U.S. Pat. Nos. 3,424,111 (Maslow) and 3,523,508 (Maslow) disclose a modular adjustable shelving system that has also achieved great commercial success under Inter-Metro Industries' trademark SUPER ERECTA SHELF. This system comprises a formed-wire shelf component having a frusto-conically-shaped collar at each corner for receiving a support post. Each collar tapers outwardly toward its lower extremity when viewed in normal use. Generally cylindrical support posts, each having a plurality of uniformly spaced annular grooves formed in its outer surface, are secured to the shelf by means of a mounting assembly. Each mounting assembly comprises at least two separate, complementary, conical-shaped mounting members which are joined about and at least partially surround the support posts to define a sleeve. The outer surface of each sleeve is frusto-conically shaped. Thus, the mounting member is thickest at its bottom. The sleeves are sized to fit snugly within the shelf collars. A rib formed on an inside surface of each sleeve is sized to engage the grooves formed in the support posts.

In use, sleeves are first placed about each support post such that the rib formed on the inside surface of each sleeve engages an appropriate groove in the support at the desired height. The support posts within the sleeves mounted thereon are then each passed through one respective collar at a corner of each shelf. The collars, sleeves, and posts firmly engage each other due to their relative respective sizes. When all support posts are inserted, the shelving system is placed in position and is ready for use. As the load on the shelf increases, a radially-inwardly directed force between the collars and sleeves brings the sleeves into locking relation with the posts due to the wedging action between the collars and sleeves.

U.S. Pat. No. 3,755,705 (Maslow) discloses an adjustable shelving system similar to U.S. Pat. No. 3,523,508.

Other examples of known shelving systems are disclosed in U.S. Pat. No. 3,316,864 (Maslow); U.S. Pat. No. 4,629,077 (Niblock); U.S. Pat. No. 4,799,818 (Sudimak, et al.); U.S. Pat. No. 4,811,670 (Kolvites, et al.); U.S. Pat. No. 4,892,044 (Welsch); U.S. Pat. No. 4,964,350 (Kolvites, et al.); and U.S. Pat. No. 4,989,519 (Welsch, et al.).

Commonly assigned U.S. patent application Ser. No. 08/093,331 further improves upon the shelving systems disclosed above by providing hanger brackets which permit easy installation and/or removal of one or more intermediate shelves without requiring the disassembly of the entire shelving system. Toward that end, that application discloses a plurality of elongated hanger-bracket-receiving slots formed in the support posts at regular vertical intervals for receiving the hanger brackets. A notch in each hanger bracket receives a truncated corner of an intermediate shelf assembly. The hanger brackets are secured to the support posts at any desired height after the basic shelving assembly is assembled and support one or more intermediate shelves.

As a further improvement of conventional shelving systems, it would be desirable to provide hanger brackets that include means for securing or locking an intermediate shelf or shelves and the hanger brackets to the shelving assembly. In this manner, the intermediate shelf could not be dislodged by, for example, an accidental upward force.

SUMMARY OF THE INVENTION

It is a general object of the present invention to improve upon conventional modular shelving systems.

It is another object of the present invention to provide an inexpensive, knockdown, modular shelving system that can be readily assembled and disassembled with minimal effort and without tools, and yet still has high strength, stability and rigidity.

It is still another object of the present invention to provide a substantially open, formed-wire shelving system which is aesthetically pleasing, simply fabricated, stable in use, corrosion-resistant and readily cleaned.

It is yet another object of the present invention to provide a shelving system which permits easy installation and/or removal of one or more shelves without requiring the disassembly of the entire shelving system.

It is a further object of the invention to provide a shelving system which ordinarily secures or locks an easily removable intermediate shelf to the assembled shelving system.

In one aspect of the invention, a modular shelving system is comprised of a first shelf assembly, a second shelf assembly, a plurality of support posts disposed between and removably secured to the first shelf assembly and the second shelf assembly, and a plurality of hanger brackets removably secured to the posts. The hanger brackets are disposed in at least one group at a common elevation, and an intermediate shelf is supported by the hanger brackets. In addition, each hanger bracket includes a locking clip for securing the intermediate shelf to the hanger brackets.

In another aspect of the invention, each locking clip also secures the hanger bracket to the respective support post.

In accordance with another aspect of the invention, a shelving system comprises a substantially rectangular first shelf assembly, a substantially rectangular second shelf assembly, and a plurality of support posts disposed from and removably secured to the first shelf assembly and the second shelf assembly. The support posts have a plurality of slots arranged at predetermined vertical intervals, with the slots being oriented toward an interior space of the shelving system. A plurality of hanger brackets are arranged in at least one group at a common elevation, wherein each hanger bracket is formed to be removably inserted in the slots in the supports posts, and at least one intermediate shelf is removably support by the group of hanger brackets. In addition, locking means are provided to secure the intermediate shelf to the hanger brackets.

In accordance with yet another aspect of the invention, a locking hanger bracket is provided for supporting an intermediate shelf assembly in a shelving system having first and second shelf assemblies, and a plurality of support posts disposed between and removably secured to the first shelf assembly and the second shelf assembly. The locking hanger bracket comprises a hanger bracket body having a first leg portion insertable in a first opening in the support post and a second leg portion insertable in a second opening adjacent the first opening in the support post, and a notch formed in the hanger bracket body for receiving the intermediate shelf assembly. A locking clip is rotatably secured to the hanger bracket body and is rotatable to cover the notch and secure the intermediate shelf assembly. The locking clip is received in a slot provided in the hanger bracket body. The locking clip also grips the support post to prevent relative movement between the hanger bracket and the support post.

These and other objects, aspects, features and advantages of the present invention will become apparent from the following detailed description of the preferred embodiments taken in conjunction with the accompanying drawings.

DESCRIPTION OF THE PREFERRED EMBODIMENTS

Initially, for purposes of explanation, the attitude and location of components of the shelving system of the present invention will be defined with reference to a fully assembled system when viewed in normal use. Accordingly, the term "horizontal" refers to a direction parallel to a surface on which the fully assembled shelving system is supported in normal use. Similarly, the term "vertical" refers to a direction substantially perpendicular to the horizontal direction. "Base" refers to the end of the shelving system closest to the surface on which the shelving system is supported, and "top" refers to the opposite end. The "front" "rear" "left side" and "right side" of the shelving system are relative terms as will be defined below.

Figure 1:
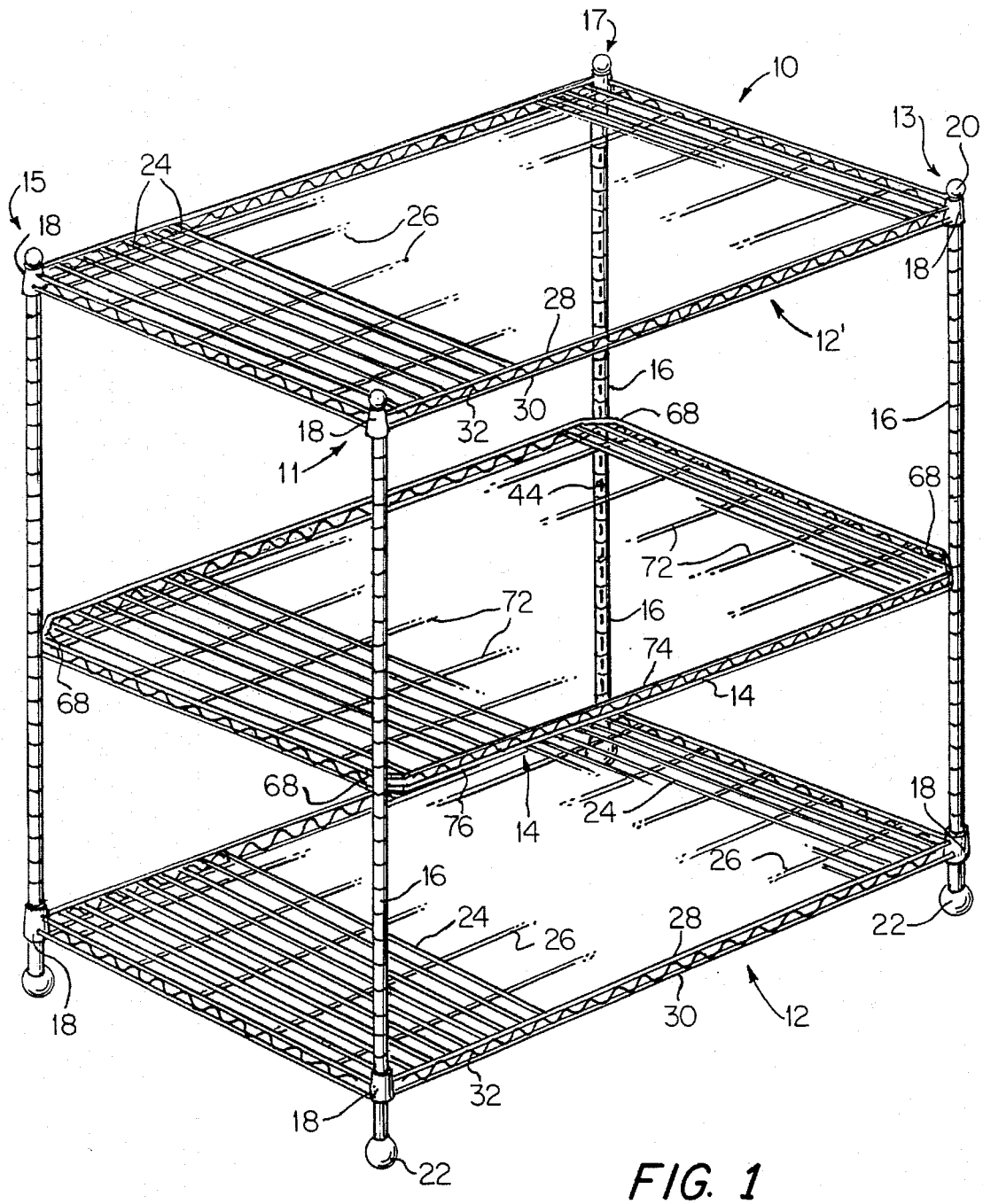
FIG. 1 is a fragmented, perspective view of an assembled modular shelving system, constructed in accordance with a preferred embodiment of the present invention.

FIG. 1 illustrates a preferred embodiment of the shelving system 10. For purposes of explanation, reference numerals 11, 13, 15 and 17 respectively designate left-front, right-front, left-rear, and right-rear corners of the shelving system 10. While the system 10 will be described in detail below, it generally comprises a first polygonal frame assembly serving as a base shelf assembly 12, and a second identical frame assembly 12' serving as a top shelf assembly, one or more intermediate shelf assemblies 14, illustrated more clearly in other figures and described in detail below, and a plurality of support posts 16.

The locking hanger brackets in accordance with the invention are not shown in FIG. 1, but will be discussed in detail below.

While the shelf assemblies 14 are denoted as "intermediate", it is to be understood that for purposes of this specification and the concluding claims they can be mounted between or on either side of the base and top shelf assemblies. Further, the base and top shelf assemblies need not be mounted at the extreme top and bottom of the corner posts.

A collar 18 of the type described in U.S. Pat. Nos. 3,424,111; 3,523,508; 3,757,705 (all to Maslow), which are incorporated herein by reference, is provided at each corner of the base and top shelf assemblies 12 and 12'. Each collar 18 may be removably secured to a support post 16. If desired, decorative post caps 20, or post feet 22 may be attached to the support posts 16.

While corner posts, shelf collars, and sleeve configurations such as are shown in U.S. Pat. No. 3,523,508 and U.S. Pat. No. 3,757,705 have been described in connection with one preferred embodiment, other corner post configurations adapted to support the top and bottom shelves may be provided.

Figure 2A:
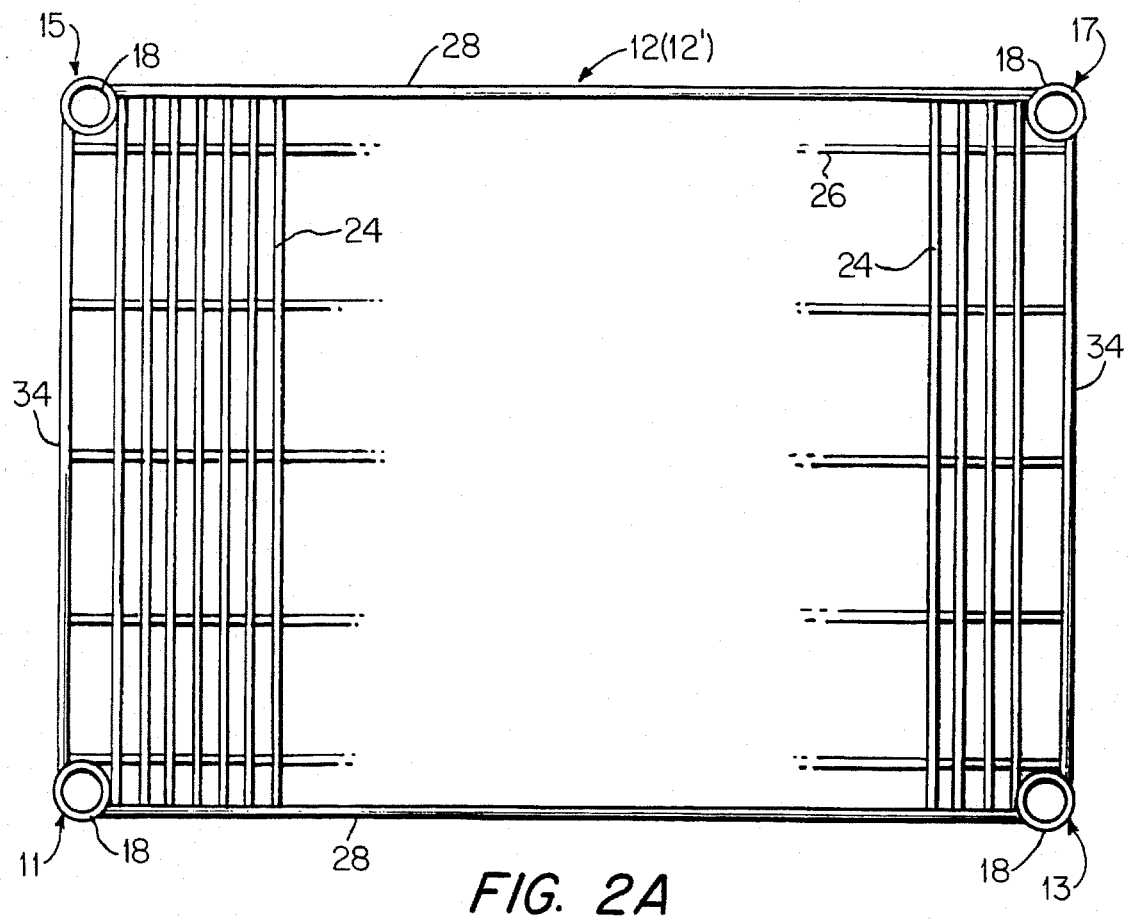
FIG. 2A is a top plan view of a shelf assembly, used in pairs as a base and a top, respectively, in the shelving system shown in FIG. 1.
Figure 2B:
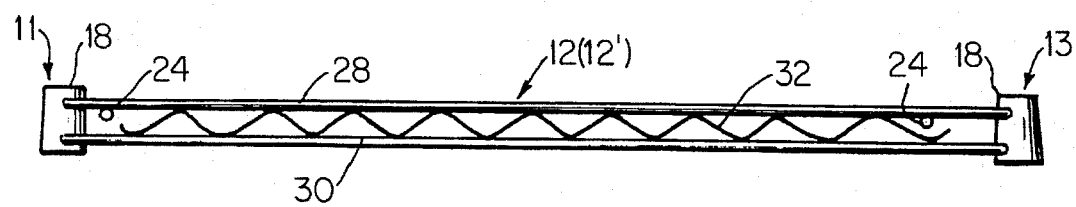
FIG. 2B is a front elevational view of the shelf assembly shown in FIG. 2A.
Figure 2C:
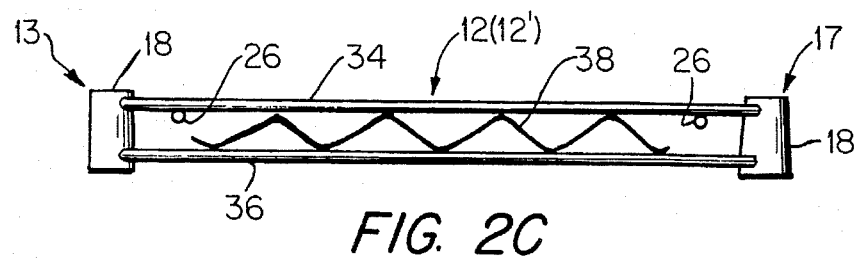
FIG. 2C is a right-side elevational view of the shelf assembly shown in FIG. 2A.

Referring now more specifically to FIGS. 2A through 2C, in a preferred embodiment of the invention, both base and top shelf assemblies 12 and 12' are generally rectangular and have a relatively long dimension running along the front and back, and a relatively short dimension running along the left and right sides of the shelving system 10. A typical shelf assembly may be approximately 36"×24"×1 5/16". Of course, many other sizes are possible. Other shapes of shelving systems, such as trapezoidal, triangular, and the like, also are possible.

As noted, both shelf assemblies 12 and 12' have a frustoconical collar 18 disposed at each corner. Each of the collars 18 is arranged so as to taper outwardly toward its lower extremity when the shelving system 10 is positioned in normal use. The collars 18 may be fabricated from cold-rolled steel or stainless steel although many different metals may be used. Four snake-like trusses, to be discussed below, along with the collars 18, define the perimeter of the frame assemblies 12 and 12'. A mat is made up of intersecting wire rods 24 and 26 that are welded to the under side of the upper ribs forming the snake trusses, and also where they intersect each other. The mat forms the support surface of the frame assemblies 12 and 12'.

With reference to FIG. 2B, a first pair of the snake trusses which form the front and back of the shelf assemblies 12 and 12' now will be discussed. The upper rib 28 and an equal length lower rib 30, formed, for example, from ¼ inch bright basic steel (B.B.S.) wire are welded at both ends to the collars 18 at the left-front corner 11 and the right-front corner 13 of the frame assemblies 12 and 12'. A continuous, snake-like rib 32 formed, for example, from number 7 American Wire Gage (AWG) B.B.S. wire is sized so as to fit between the upper and lower ribs 28 and 30 and is welded at the points where it comes in contact with the upper and lower ribs. Of course, many other wire sizes may be used to form the snake trusses depending on material cost, availability, the intended loading of the shelving system, etc. The wire rods 24 are welded at a top surface thereof to the underside of upper rib 28.

The snake trusses function as stiffener trusses at the front and back of the base and top shelf assemblies 12 and 12', respectively.

Next, as shown in FIG. 2C, a second pair of snake-like trusses form the left side and the right side of base and top shelf assemblies 12 and 12'. Each of the second pair of snake trusses comprises an upper rib 34 and an equal length, lower rib 36, both being somewhat shorter than upper and lower ribs 28 and 30, respectively. Ribs 34 and 36 also are preferably made of ¼ inch wire and are welded to the collars 18 of the right front corner 13 and the right rear corner 17 of the frame assemblies 12 and 12'. Thus, ribs 34 and 36 are substantially perpendicular to upper and lower ribs 28 and 30. Another continuous snake-like rib 38, also preferably made of number 7 AWG B.B.S. wire, is sized to fit between the upper rib 34 and lower rib 36 and is welded at the points where it comes in contact with the upper and lower ribs. The wire rods 26 are welded at a top surface thereof to upper rib 34. Again, of course, many other wire sizes may be used to form the above-mentioned components as circumstances require.

This pair of snake trusses also function as stiffener trusses at the left and right sides of the base and top shelf assemblies 12 and 12', respectively.

Thus, the front and back snake trusses are disposed substantially perpendicular to the left and right side snake trusses and in cooperation with the collars 18 at the vertices, define the perimeter of the base and top shelf assemblies 12 and 12'.

As noted above, the top shelf assembly 12' is identical to base shelf assembly 12. Consequently, its construction need not be separately discussed.

Figure 3:
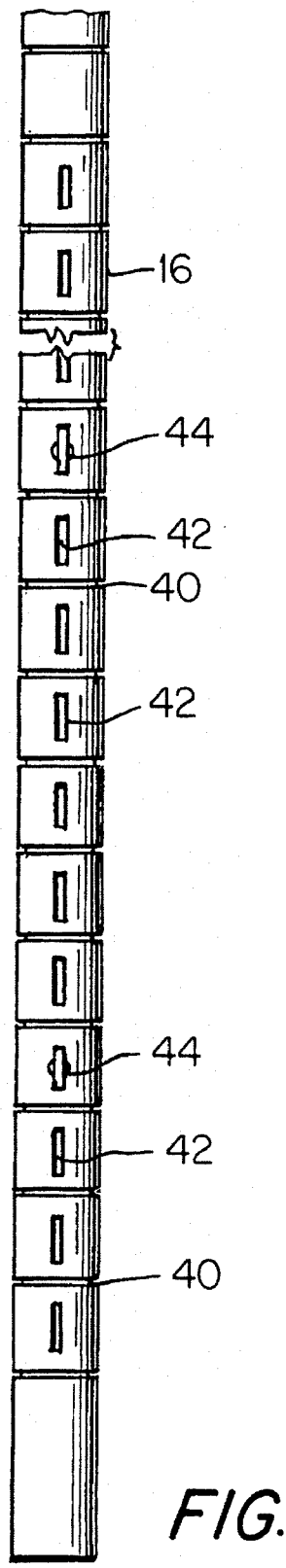
FIG. 3 is a fragmented, elevational view of a support post used in the shelving system shown in FIG. 1.

FIG. 3 shows a fragmented view of one of the support posts 16, all of which are identical. As noted generally above, a plurality of circumferential grooves 40, spaced apart at substantially regular intervals, are formed on the support post 16. These grooves are provided to receive the ribs formed on an inside surface of a supporting frusto-conical sleeve (not shown in FIG. 3) such as that described in U.S. Pat. Nos. 3,523,508 and 3,757,705.

In addition, a plurality of elongated hanger bracket-receiving slots 42 are formed in the support post 16 at regular intervals. Periodically, the slots are provided, as shown at reference numeral 44, with an arcuate center portion that is a distinguishing detail to aid in the visual location of the hanger brackets in the supporting posts 16 as will be described below. The arcuate portions are generally cosmetic and for convenience and are not necessary to the construction of the invention. The slots cooperate with the specially designed hanger brackets to support one or more intermediate shelves in the shelving system.

The support posts 16 are generally hollow and are typically made of metal, most preferably nickel-chrome plated or decoratively coated cold-rolled steel or stainless steel tubing. These compositions are relatively lightweight, provide high structural rigidity, and are inexpensive to manufacture by known metal forming methods. Further, these materials are resistant to corrosion and are easily cleaned. Still further, the bracket-receiving slots 42 and 44 and the grooves 40 may be efficiently formed therein, using known metal forming methods.

Alternatively, the support posts 16 may be made of any conventional material which can be formed to define the above features, particularly including materials such as metals or plastics. Such alternative materials may be well suited to particular shelving system applications.

Figure 4:
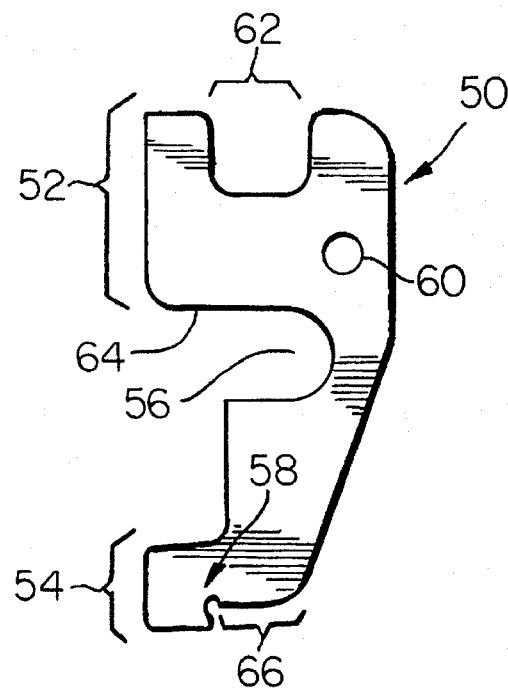
FIG. 4 is a side elevational view of a hanger bracket shown, for illustration purposes, without a locking clip, with a plurality of the hanger brackets being removably secured to the support posts to support an intermediate shelf in the shelving system shown in FIG. 1.

FIG. 4 shows a hanger bracket 50 which is inserted in slots 42 and/or 44 in one of the support posts 16 and is used to support an intermediate shelf 14. A locking clip rotatably secured to the hanger bracket in accordance with the present invention is not depicted in FIG. 4 so the entire shape of the hanger bracket can be shown as it is discussed. Each hanger bracket 50 includes a first leg portion 52 which engages an relatively upper slot and a second leg portion 54 which engages a relatively lower slot of the support post in "bayonet"-like fashion.

More particularly, the upper part of the hanger bracket 50 is formed with an upwardly open shelf receiving notch 62 that has a stepped left side 63 (as seen in FIG. 4), defining a ledge 65 on the inner surface of the first leg 52. The purpose of this ledge will be explained in greater detail below. A further slot 56 is provided at the lower end of the first leg portion for receiving the locking clip as discussed below. A small upwardly projecting lug 57 is formed on the leftmost edge of the lower surface defining the slot 56. A corner 58 at the lower end of the second leg portion 54 is relieved somewhat to avoid the formation of stress fractures during load bearing conditions. To facilitate plating, a hole 60 is provided such that the hanger brackets may be supported on a pin. The hanger brackets may be made from a variety of readily available materials, including metals and plastics using conventional techniques. However, they are preferably stamped from cold-rolled steel.

Figure 5:
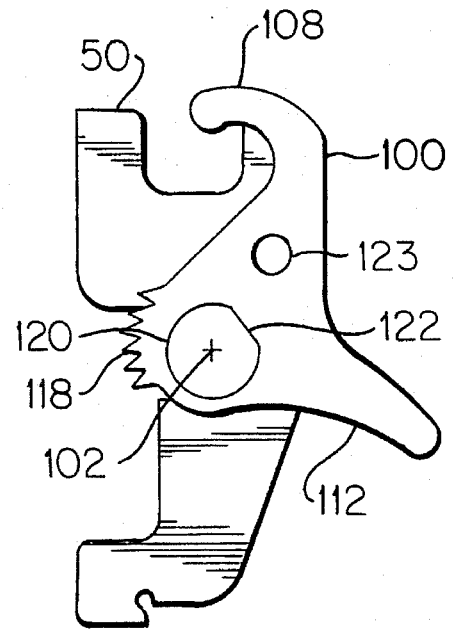
FIG. 5 is a side elevational view of the hanger bracket with an installed locking clip in accordance with the present invention.

FIG. 5 shows the hanger bracket 50 and a locking clip 100 in association therewith. The locking clip rotatably engages the slot 56 in the hanger bracket and pivots relative to the hanger bracket about an axis 102. The locking clip is formed from two substantially identical clip halves 104 and 106 joined together at the axis 102 and at a tail portion to sandwich the hanger bracket therebetween.

Figure 6A:
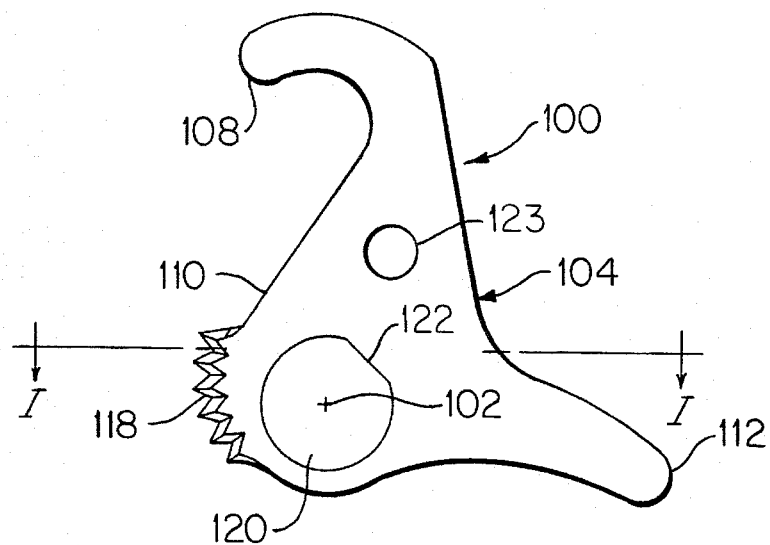
FIG. 6A is a side elevational view of the locking clip in accordance with the present invention.
Figure 6B:
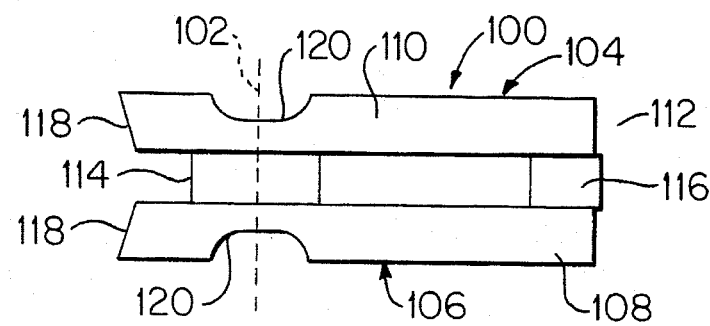
FIG. 6B is a top plan view of the locking clip shown in FIG. 6A taken along plane I—I in FIG. 6A.
Figure 6C:
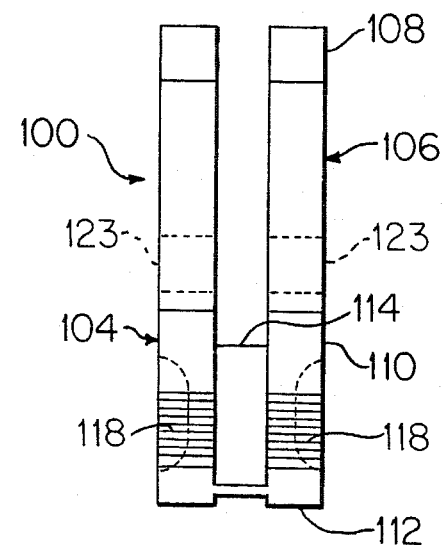
FIG. 6C is a front elevational view of the locking clip shown in FIG. 6A.

The locking clip 100 will be discussed in detail with reference to FIGS. 6A through 6C. Each clip half is provided with a hooked nose portion 108, a mid-portion 110 through which the pivoting axis 102 extends, and a tail portion 112. As best seen in FIGS. 6B and 6C, the two halves 104 and 106 are joined together at the mid-portion by an axle 114 and at the tail portion by bridge 116 to form a single integral unit. The locking clip is preferably molded from plastic, with polypropylene being the material of choice. While the clip is described as comprising two halves, it will of course be understood that it may be molded as a single piece or as the two halves which are subsequently joined together to define the unitary structure.

A series of teeth 118 are formed in the mid-portion of each clip half for engaging the support posts when the locking clip is rotated to a locking position as described in more detail below. FIG. 6A shows six (6) teeth being formed, although the number of teeth can, of course, vary. The teeth are also preferably angled inwardly as shown in FIG. 6B to squarely face the support post and provide more gripping surface area.

The mid-portion has exterior recesses 120, where the axle 114 joins the two clip halves, to decrease the amount of plastic consumed in formation of the clip. The axle is generally circular in cross-direction except for a flat surface 122 shown in phantom in FIGS. 5 and 6A. The flat surface 122 of the clip is aligned to be coplanar with the upper surface of the slot 56 in the hanger bracket so that the clip can be easily slid into the slot past the lug 57. However, when the clip is rotated from that attitude such that the axle rides tightly in the arcuate portion of the slot 546, the lug 57 will retain the clip in place on the bracket. The flat surface 122 may also that provide a tactile feel by interaction with the surface of the slot 56 when rotating the locking clip.

A hole 123 formed in each clip half generally aligns with hole 60 in the hanger bracket as the locking clip is rotated to the locking position.

Figure 8A:
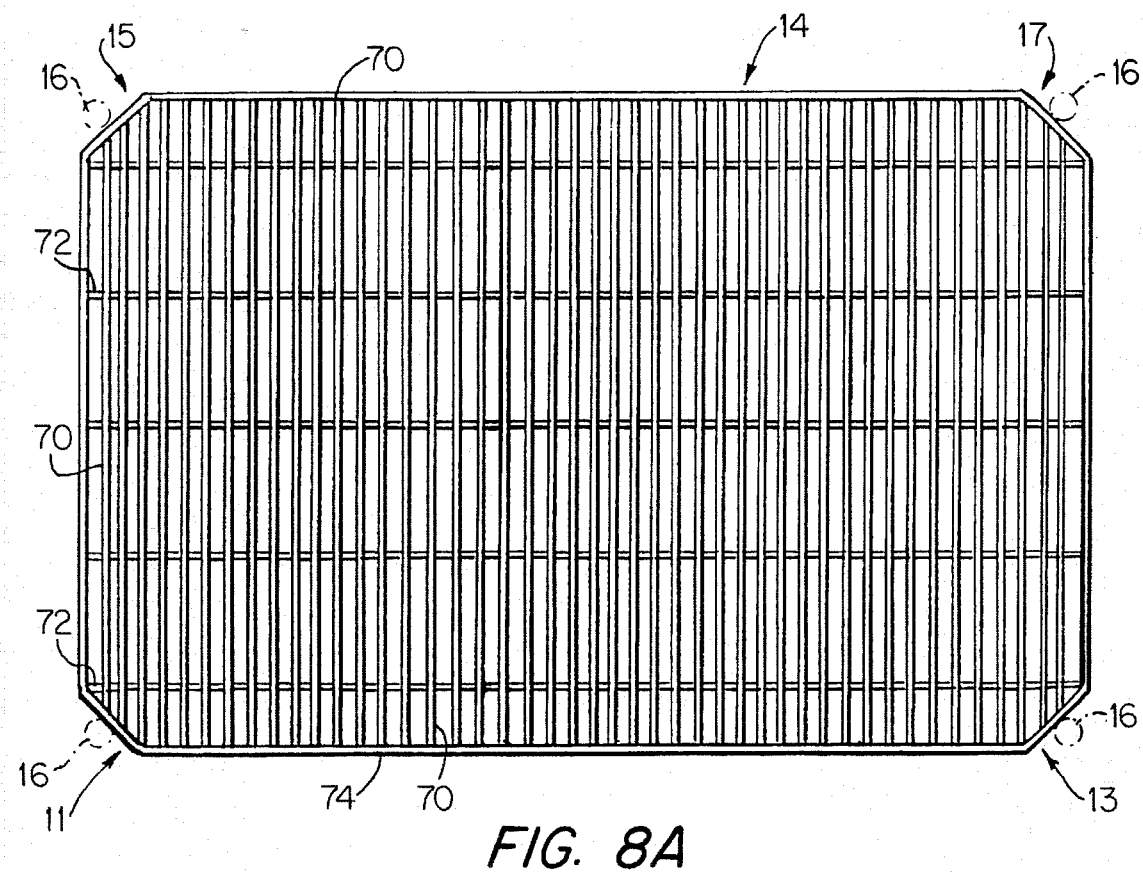
FIG. 8A is a top plan view of an intermediate shelf assembly used in the shelving system shown in FIG. 1.

FIG. 8A shows a top plan view of a preferred embodiment of an intermediate shelf assembly 14 of the shelving system 10. The intermediate shelf assembly 14 is a polygon and comprises at least three trusses substantially to define a perimeter of the intermediate shelf assembly 14. The region where adjacent trusses would otherwise intersect is truncated to define a mounting section 68 for engagement with one hanger bracket 50 of one group of hanger brackets supported at four common vertical locations on the support posts.

The intermediate shelf assembly 14 according to a preferred embodiment of the invention is generally rectangular and has a relatively long dimension running along the front and back, and a relatively short dimension running along the left and right sides of the shelving system 10. A typical intermediate shelf assembly may be approximately 36"×24"×1 5/16". Of course, other sizes are possible. Indeed other shapes of intermediate shelf assemblies, such as trapezoidal, triangular, and the like, also are possible.

As will be readily seen, the intersection of the front, back, right, and left sides of the intermediate shelf assembly are truncated to form mounting sections as discussed generally above. A mat of intersecting wire rods 70 and 72 form the primary support surface of the intermediate shelf assembly 14.

Figure 8B:
FIG. 8B is a front elevational view of the intermediate shelf assembly shown in FIG. 8A.

More particularly, as shown in FIG. 8B, a first pair of snake trusses form the front and back of the intermediate self assembly 14. For each snake truss an upper rib 74 and an equal length lower rib 76 are provided. A continuous, snake-like rib 78 is welded at the points where it comes in contact with the upper and lower ribs. A plurality of cross members 70 are welded at their top to the bottom of upper rib 74. The reference numeral 68 shows the portions of the truncated corners of the intermediate shelf assembly 14 which are viewed from the front. As noted, the truncated portions are referred to herein as the mounting sections of the intermediate shelf assembly 14.

Figure 8C:
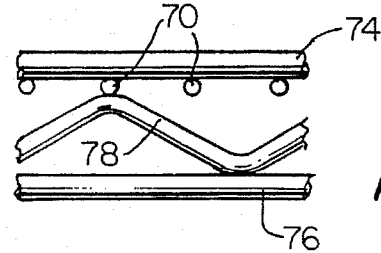
FIG. 8C is a partial detail of the front elevational view of the intermediate shelf assembly shown in FIG. 8B.

With reference to FIG. 8C, it is seen that the snake-like rib 78 is welded at each of its apexes to an underside of a wire rod 70.

Figure 8D:
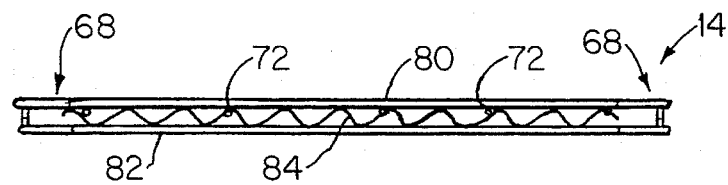
FIG. 8D is a right-side elevational view of the intermediate shelf assembly shown in FIG. 8A.

With reference to FIG. 8D, it is seen that the right side of the intermediate shelf assembly is formed substantially similar to that of the front of the intermediate shelf assembly. Specifically, an upper rib 80 and a lower rib 82 are connected by means of a continuous snake-like rib 84 which is welded where it comes in contact with the ribs. It will be understood that although the upper ribs 74 of the front and back of the intermediate shelf assembly 14 are numbered differently than the upper ribs 80 of the sides of the intermediate shelf assembly, one continuous rib may be used to form the entire perimeter. The same is true of the lower ribs.

Cross members 72 are welded at their top surface to an underside of upper rib 80 and to the underside of cross-members 70 at the point where they intersect. The reference number 68 shows the portions of the truncated corners of the intermediate shelf assembly 14 which are viewed from the right side.

As shown in the Figures the peripheral trusses extend across each of the truncated mounting sections 68. However, it must also be noted that it is possible, and in some instances preferable, to terminate the trusses short of the truncated mounting section such that those mounting sections are defined only by the upper peripheral rib.

To assemble the shelving system, support posts 16 are passed through corresponding bottom and top collars 18 at each corner of the shelving system 10. The base and top shelf assemblies, 12 and 12', are then secured to a support post 18, by inserting selected mounting hardware such as discussed previously. Additional support posts 16 are passed through each of the remaining corner pairs of corresponding base and top collars 18 and are similarly secured. If desired, post caps 20 or post feet 22 are secured at the top and bottom, respectively, of the support posts 16. The shelving system now is conveniently placed in the vertical position.

The shelving system is secured because the collars 18 grip the support posts 16 by means of the sleeves. The rigidity of the shelving system 10 is yet further increased by inserting downward pressure on the base and top shelf assemblies 12 and 12'. As noted previously, the load on the shelving system in normal use also adds to the rigidity and stability of the shelving system. The shelving system 10, thus configured, is now ready to receive one or more intermediate shelf assemblies.

Figure 7A:
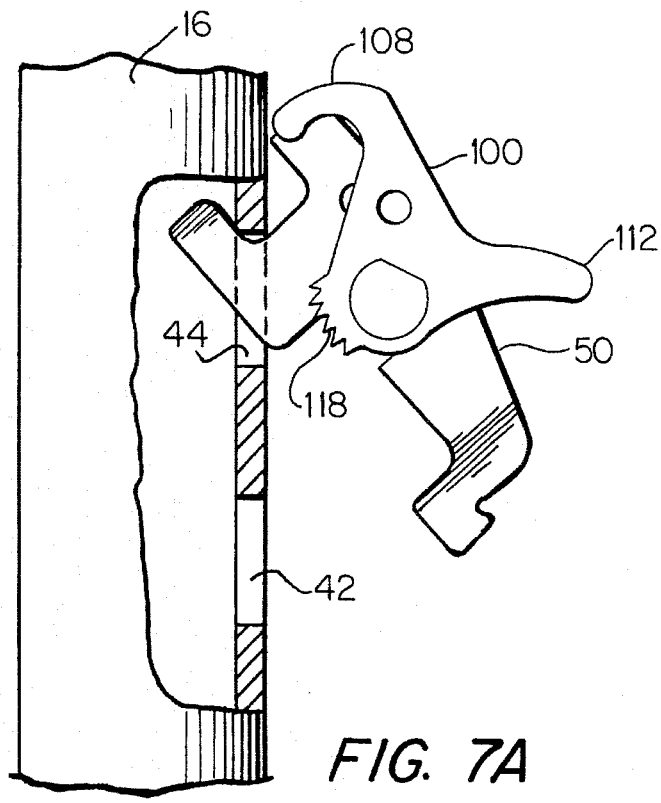
FIG. 7A is a fragmented side elevational view of the locking hanger bracket shown in FIG. 5 partially inserted in a first opening of the support post shown in FIG. 3.

After the base shelf assembly 12 and top shelf assembly 12' are secured at each corner to the support posts 16, a plurality of hanger brackets 50 are inserted in the support post 16. As shown in FIG. 7A and FIG. 3, a hanger bracket 50 may be positioned at an angle relative to support post 16 and first leg portion 52 is inserted into a slot, such as slot 44, for example. The shelf-receiving notch 62 is deep enough inside of the edge 65 to be received fully in the slot 44 so that the leftmost surface of the notch below the ledge can initially contact the inner wall of the support post and top edge of the slot 44.

Figure 7B:
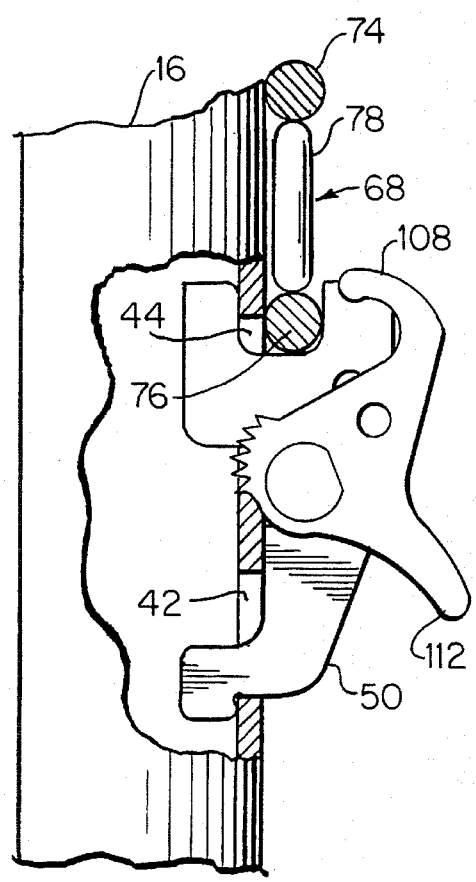
FIG. 7B is a fragmented, side elevational view of the locking hanger bracket inserted in the first and second opening of the support post shown in FIG. 3 resulting in a shelf-supporting position, with the locking clip in the retracted position.

As shown in FIG. 7B, the hanger bracket 50 is then rotated about its contact with the internal wall of the support post 16 and the second leg portion is inserted into the relatively lower slot 42. It will be readily appreciated that the hanger bracket may engage any two adjacent slots. The hanger bracket 50 then is allowed to drop down in a bayonet-like manner such that load bearing portions 64 and 66 adjacent the lower ends of the legs 52 and 54 are supported by the bottoms of slots 44 and 42, respectively.

In addition, as clearly shown in FIG. 7B, the ledge 65 will assume a position underneath the lower surface of the upper post slot 44 so that vertical movement of the hanger bracket is limited. In this attitude, the hanger bracket is ready to receive a mounting section 68 of an intermediate shelf 14 in notch 62, as will be described in detail below.

The width of the notch 62 is sized to take into account the wall thickness of the support post 16 and the diameter of a lower rib of a mounting section 68 of the intermediate shelf assembly 14 to ensure a snug fit which adds to the rigidity of the shelving system 10. In FIG. 7B, the locking clip is shown in the retracted or unlocked position. One hanger bracket is located, as described, at a common elevation for each mounting section 68 of the intermediate shelf assembly 14. The hanger brackets 50 should face in a direction toward the interior of the shelving system 10. As each hanger bracket is secured in the support post waiting to receive a truncated corner of the intermediate shelf, the locking clip is in a retracted position so as not to block the path into intermediate shelf receiving notch 62. An intermediate shelf assembly 14 is inserted at an angle between the support posts 5 and the lower rib of the mounting sections 68 and is inserted on one side of the intermediate shelf assembly into the shelf receiving notch 62 of the hanger brackets 50 at that side as shown in FIG. 7B. The shelf is then rotated to a horizontal position such that the other side of the mounting section 68 engages the shelf receiving notches 62 in the hanger brackets at the other side.

Figure 7C:
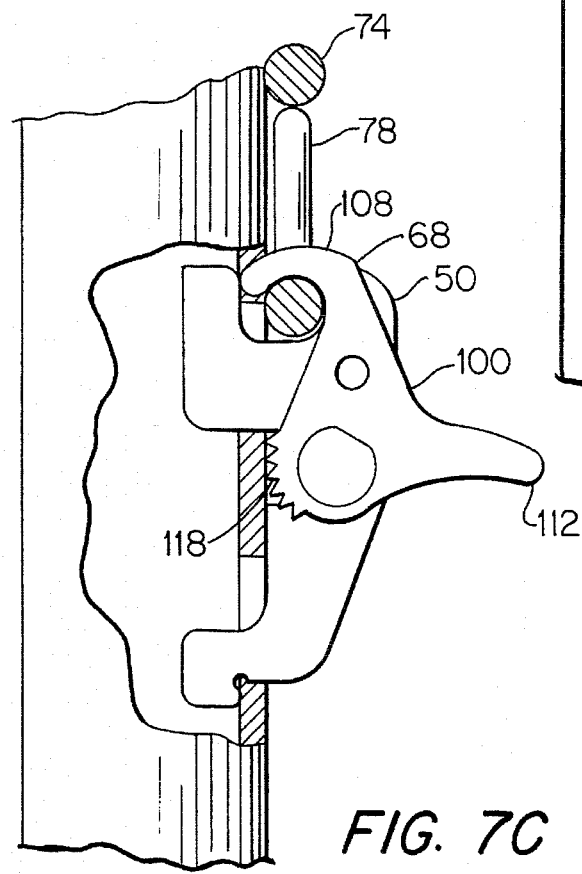
FIG. 7C is a fragmented, side-elevational view of the locking hanger bracket with the locking clip in the locking position.

Once the intermediate shelf is mounted in the hanger bracket, each locking clip is rotated about axis 102, by manipulating the tail section, for example, to swing the nose portion 108 over lower rib 76. The locking clip is now in the locked position as shown in FIG. 7C and secures, or locks, the intermediate shelf in the mounted condition. In the locked position, the locking clip prevents the intermediate shelf from movement relative to the hanger bracket. Moreover, in the locked position both sets of teeth 118 engage the support post (see FIG. 7C) and force the hanger bracket to a position wherein the ledge 65 underlies the bottom surface of the upper post slot 44. Therefore, hanger bracket is prevented from moving relative the support post in a vertical direction.

It will be understood that if the intermediate shelf is formed so that the truncated mounting sections 68 are defined only by the upper peripheral rib 74, then it is this rib 74 which will be embraced by the nose 108 of the locking clip on the hanger bracket.

Although the shelving system 10 has been shown with a base shelf assembly 12 and a top shelf assembly 12' and one intermediate shelf assembly 14, other configurations are contemplated. For example, additional intermediate shelf assemblies 14 may be conveniently added. Further, if a very tall shelving system is needed, it may be desirable to use an additional shelf assembly of the type used for the base and top in a central portion of the shelving system. A number of intermediate shelf assemblies 14 then may be inserted between such a "central" shelf assembly and the top shelf assembly and between the central shelf assembly and the base shelf assembly. The addition of one or more of such central shelf assemblies serves to make the shelving system even more stable and helps to prevent racking. Such a shelving system is still advantageous because the intermediate shelf assemblies 14 may still be readily installed and removed without disassembling the entire system.

Thus, what has been described is an inexpensive, stable, light-weight vertical shelving system capable of being very easily assembled and disassembled.

Of course, all specific shapes, dimensions, wire sizes, number of shelves, and materials mentioned herein are provided by way of example only. Shelving systems fabricated in shapes, dimensions and using different wire sizes and materials and having a different number of shelves other than those discussed and illustrated herein also are contemplated.

Although specific embodiments of the present invention have been described above in detail, it will be understood that this description is merely for purposes of explanation. Various modifications of equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A shelving system, comprising:
 a first shelf assembly;
 a second shelf assembly;
 a plurality of support posts disposed between and removably secured to said first shelf assembly and said second shelf assembly;
 a plurality of hanger brackets removably secured to said support posts, said hanger brackets disposed in at least one group;
 at least one intermediate shelf assembly removably supported by said one group of hanger brackets; and
 locking means, rotatably mounted to and cooperating with said hanger brackets, for locking said intermediate shelf assembly to said one group of hanger brackets.

2. A shelving system according to claim 1, wherein said locking means includes a locking clip rotatably mounted on each said hanger bracket for movement between a locked position and an unlocked position.

3. A shelving system according to claim 2, wherein each said locking clip includes a nose portion contacting said intermediate shelf when said locking clip is rotated to the locked position.

4. A shelving system according to claim 2, wherein each said locking clip includes a plurality of teeth contacting one of said support posts when said locking clip is rotated to the locked position.

5. A shelving system according to claim 1, wherein said locking means includes first and second locking clip halves sandwiching one said hanger bracket therebetween and being rotatably mounted thereon for movement between a locked position and an unlocked position.

6. A shelving system according to claim 5, wherein each said locking clip half includes a nose portion for contacting said intermediate shelf and a plurality of teeth for contacting one of said support posts when said locking means is rotated to the locked position.

7. A shelving system according to claim 6, wherein said plurality of teeth of said first and second locking clip halves are angled inwardly to face said support post.

8. A shelving system according to claim 6, wherein each said locking clip half further includes a mid-portion and a tail portion, said respective mid-portions of each said half being joined together by an axle rotatably supported in said hanger bracket, and said respective tail portions of each said half being bridged together to form an integral, one-piece locking clip.

9. A shelving system, comprising:

a substantially rectangular first shelf assembly;

a substantially rectangular second shelf assembly;

a plurality of support posts disposed from and removably secured to said first shelf assembly and said second shelf assembly, said support posts having a plurality of slots arranged at predetermined vertical intervals, said slots being oriented toward an interior space of the shelving system;

a plurality of hanger brackets arranged in at least one group, wherein each said hanger bracket is formed to be removably inserted in the slots in said support posts;

at least one intermediate shelf being removably supported by said one group of hanger brackets; and locking means, rotatably mounted to and cooperating with said hanger brackets, for locking said intermediate shelf to said hanger brackets and impeding vertical movement between said hanger brackets and said support posts.

10. A shelving system according to claim 9, wherein each said hanger bracket comprises a body having a first leg portion insertable in a first slot in said support post and a second leg portion spaced from said first leg portion and insertable in a second slot in said support post adjacent the first slot.

11. A shelving system according to claim 10, wherein said hanger bracket further comprises an intermediate shelf assembly receiving notch proximate to said first leg portion, and a slot disposed between said first and second leg portions for receiving and rotatably supporting said locking means.

12. A shelving system according to claim 10, wherein said locking means includes first and second locking clip halves sandwiching said hanger bracket therebetween and being rotatably mounted thereon for movement between a locked position and an unlocked position.

13. A shelving system according to claim 12, wherein each said locking clip half includes a nose portion for contacting said intermediate shelf and a plurality of teeth for contacting one of said support posts when said locking means is rotated to the locked position.

14. A shelving system according to claim 13, wherein said plurality of teeth of said first and second locking clip halves are angled inwardly to squarely face said support post.

15. A shelving system according to claim 13, wherein each said locking clip half further includes a mid-portion and a tail portion, with said respective mid-portions of each said half being joined together by an axle rotatably supported in said hanger bracket, and said respective tail portions of each said half being bridged together to form an integral, one-piece locking clip.

16. A locking hanger bracket for supporting an intermediate shelf assembly in a shelving system having at least a first shelf assembly, and a plurality of support posts disposed between and removably secured to the first shelf assembly, said locking hanger bracket comprising:

a hanger bracket body having a first leg portion removably insertable in a first opening in the support post and a second leg portion removably insertable in a second opening in the support post spaced from the first opening;

means defining a notch in said hanger bracket body for receiving at least a portion of the intermediate shelf assembly;

a locking clip rotatably supported on said hanger bracket body and rotatable to cover an opening of the notch and lock the portion of the intermediate shelf assembly thereto; and a slot in said hanger bracket body for rotatably receiving said locking clip.

17. A hanger bracket according to claim 16, wherein said locking clip includes first and second locking clip halves sandwiching said hanger bracket body therebetween and being rotatably mounted thereto for movement between a locked position and an unlocked position.

18. A hanger bracket according to claim 17, wherein each said locking clip half includes a nose portion for contacting the intermediate shelf and a plurality of teeth for contacting one of the support posts when said locking clip is rotated to the locked position.

19. A hanger bracket according to claim 18, wherein said plurality of teeth of said first and second locking clip halves are angled inwardly squarely to face the support post.

20. A shelving system according to claim 18, wherein each said locking clip half further includes a mid-portion and a tail portion, said respective mid-portions of each said half being joined together by an axle rotatably supported on said hanger bracket, and said respective tail portions of each said half being bridged together to form an integral, one-piece locking clip.

21. A shelving system according to claim 16, wherein said means defining a notch in said hanger bracket body also supports the intermediate shelf assembly.

* * * * *